(12) United States Patent
Jiang et al.

(10) Patent No.: US 12,126,593 B2
(45) Date of Patent: Oct. 22, 2024

(54) VALIDATION-BASED SERVICE REQUEST HANDLING

(71) Applicant: VMware LLC, Palo Alto, CA (US)

(72) Inventors: Jingchun Jiang, Beijing (CN); Bo Lin, Beijing (CN); Dongping Chen, Beijing (CN); Qi Wu, Beijing (CN); Yi Zeng, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/132,438

(22) Filed: Apr. 10, 2023

(65) Prior Publication Data
US 2024/0236037 A1     Jul. 11, 2024

(30) Foreign Application Priority Data
Jan. 10, 2023    (WO) ................ PCT/CN2023/071606

(51) Int. Cl.
*H04L 61/5014*    (2022.01)
*H04L 41/40*    (2022.01)
*H04L 41/50*    (2022.01)

(52) U.S. Cl.
CPC .......... *H04L 61/5014* (2022.05); *H04L 41/40* (2022.05); *H04L 41/50* (2013.01)

(58) Field of Classification Search
None
See application file for complete search history.

(56) References Cited

U.S. PATENT DOCUMENTS

| | | | |
|---|---|---|---|
| 2016/0119405 A1* | 4/2016 | Karpoor ................. | G06Q 10/06 709/217 |
| 2018/0137026 A1* | 5/2018 | Jeeva ................... | G06F 11/3664 |
| 2019/0095954 A1* | 3/2019 | Ren ..................... | G06Q 30/0269 |
| 2023/0370461 A1* | 11/2023 | Kalley .................. | H04L 63/104 |

\* cited by examiner

*Primary Examiner* — Atta Khan (74) *Attorney, Agent, or Firm* — King Intellectual Asset Management (57) ABSTRACT

Example methods and systems for validation-based service request handling are described. In one example, a computer system may obtain, from a management entity, configuration information specifying a unicast service address associated with a service node capable of providing a network service. In response to detecting a service request from the virtualized computing instance, the computer system may generate a modified service request that (a) is destined for the unicast service address and (b) includes a validation identifier (ID) associated with the virtualized computing instance. The modified service request may be forwarded towards the service node to cause the service node to perform validation based on the validation ID to determine whether to provide the network service. In response to detecting a service response from the service node, the service response, or a modified service response, may be forwarded towards the virtualized computing instance.

21 Claims, 7 Drawing Sheets

| 510<br>P1<br>DHCP DISCOVER<br>(BCAST) | SIP=0.0.0.0,SPN=68,<br>DIP=255.255.255.255,DPN=67<br>CLIENT MAC:MAC-VM1,<br>OPTION:(53)DHCP DISCOVER<br>OPTION:(50)REQUESTED IP ADDRESS(2.2.2.2) | |
|---|---|---|
| 530<br>P1*<br>DHCP DISCOVER<br>(UCAST) | SIP=0.0.0.0→IP-VMKNIC, SPN=68,<br>DIP=255.255.255.255→IP-SERVICE, DPN=67<br>CLIENT MAC:MAC-VM1<br>OPTION:(53)DHCP DISCOVER<br>OPTION:(50)REQUESTED IP ADDRESS (2.2.2.2)<br>OPTION:(82)VID=(VIF1,LS1) | } 531<br><br><br><br>} 532 |
| 570/580<br>P2<br>DHCP OFFER<br>(BCAST) | SIP=IP-SERVICE,SPN=67,<br>DIP=IP-VMKNIC,DPN=68<br>CLIENT MAC:MAC-VM1<br>YOUR (CLIENT) IP ADDRESS:2.2.2.2<br>OPTION:(53)DHCP OFFER | |
| 590<br>P2*<br>DHCP OFFER<br>(UCAST) | SIP=IP-SERVICE,SPN=67,<br>DIP=IP-VMKNIC→2.2.2.2,DPN=68<br>CLIENT MAC:MAC-VM1<br>YOUR (CLIENT) IP ADDRESS:2.2.2.2<br>OPTION:(53)DHCP OFFER | } 591 |

VALIDATION-BASED SERVICE REQUEST HANDLING

CROSS REFERENCE TO RELATED APPLICATION

The present application claims the benefit of Patent Cooperation Treaty (PCT) Application No. PCT/CN2023/071606, filed Jan. 10, 2023, which is incorporated herein by reference.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, VMs may require access to various network services, such as configuration service for Internet Protocol (IP) address assignment using dynamic host configuration protocol (DHCP) etc. In practice, conventional approaches for service request handling may be susceptible to security attacks.

DETAILED DESCRIPTION

According to examples of the present disclosure, validation-based service request handling may be implemented. In one example, a computer system (e.g., host-A 110A in FIGS. 1-2) may obtain, from a management entity (e.g., 180/182 in FIGS. 1-2), configuration information specifying a unicast service address (e.g., IP-SERVICE) associated with a service node (e.g., 201 in FIG. 2) capable of providing a network service. In response to detecting a service request for the network service from the virtualized computing instance (e.g., P1 220 in FIG. 2), the computer system may generate a modified service request (e.g., P1*230/240 in FIG. 2) based on the service request. For example, the modified service request may (a) be destined for the unicast service address (e.g., IP-SERVICE) and (b) include a validation identifier (ID) associated with the virtualized computing instance.

The modified service request (e.g., P1*230/240 in FIG. 2) may be forwarded towards the service node to cause the service node to perform validation based on the validation ID to determine whether to provide the network service. In response to detecting a service response (e.g., P2 260 in FIG. 2) from the service node, the service response, or a modified service response, may be forwarded towards the virtualized computing instance. Examples of the present disclosure may be implemented to improve security relating to service request handling. At the client side, the computer system may learn that the service node is a trusted entity based on the configuration information from the management entity. At the server side, the service node may perform validation based on the validation ID. In practice, this two-way security feature may be implemented to reduce the likelihood of security attacks at the computer system and/or the service node. Various examples will be explained below using FIGS. 1-7.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
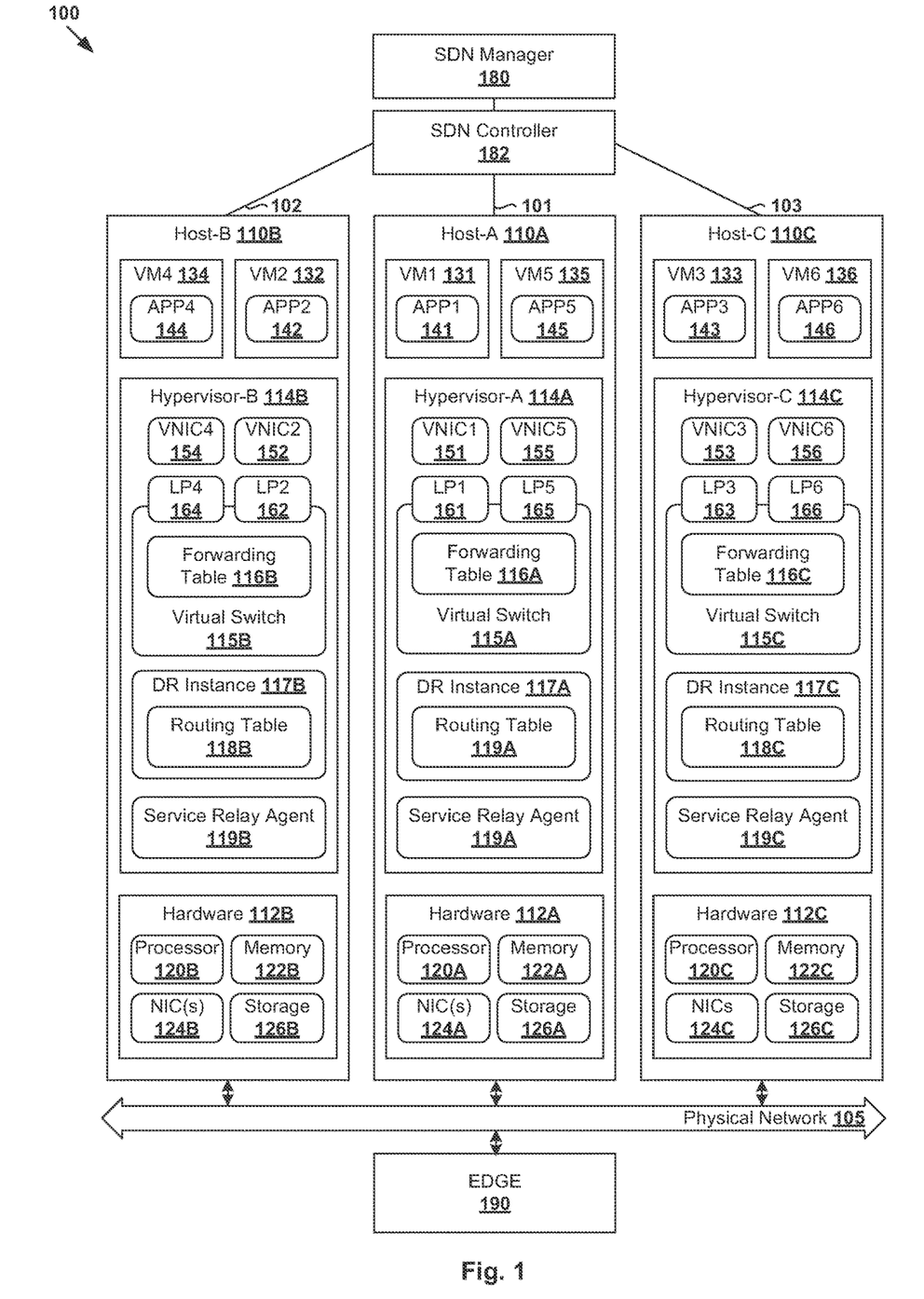
FIG. 1 is a schematic diagram illustrating an example software-defined networking (SDN) environment in which validation-based service request handling may be implemented.

FIG. 1 is a schematic diagram illustrating example SDN environment 100 in which validation-based service request handling may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-C that are inter-connected via physical network 105. Each host 110A/110B/110C may include suitable hardware 112A/112B/112C and virtualization software (e.g., hypervisor-A 114A, hypervisor-B 114B and hypervisor-C 114C) to support various virtual machines (VMs). For example, hosts 110A-C may support respective VMs 131-134. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C. Note that SDN environment 100 may include any number of hosts (also known as a "host computers", "host devices", "physical servers", "server systems", "transport nodes," etc.), where each host may be supporting tens or hundreds of VMs.

Hypervisor 114A/114B/114C maintains a mapping between underlying hardware 112A/112B/112C and virtual resources allocated to respective VMs. Virtual resources are allocated to respective VMs 131-136 to support a guest operating system and application(s); see 141-146. Any suitable applications 141-146 may be implemented, such as processes/applications labelled "APP1" to "APP4." For example, virtual resources may include virtual CPU, guest physical memory, virtual disk, virtual network interface controller (VNIC), etc. Hardware resources may be emulated using virtual machine monitors (VMMs). For example, VNICs 151-156 are virtual network adapters for respective VMs 131-136. Each VNIC may be emulated by a corresponding VMM (not shown) instantiated by hypervisor 114A/114B/114C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables (not shown) at respective DR instances 117A-C. The routing tables may each include entries that collectively implement the respective logical DRs.

Packets may be received from, or sent to, each VM via an associated logical port. For example, logical switch ports 161-166 are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

SDN controller 180 and SDN manager 182 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 182 operating on a management plane. Network management entity 180/182 may be implemented using physical machine(s), VM(s), or both. Logical switches, logical routers, and logical overlay networks may be configured using SDN controller 180, SDN manager 182, etc. To send or receive control information, a local control plane (LCP) agent (not shown) on host 110A/110B/110C may interact with central control plane (CCP) module 182 at SDN controller 180 via control-plane channel 101/102/103.

Hosts 110A-C may also maintain data-plane connectivity with each other via physical network 105 to facilitate communication among VMs 131-136. Hypervisor 114A/114B/114C may implement a virtual tunnel endpoint (VTEP) (not shown) to encapsulate and decapsulate packets with an outer header identifying the relevant logical overlay network (e.g., VNI). For example in FIG. 1, hypervisor-A 114A may implement a first VTEP associated with (IP address=IP-A, VTEP label=VTEP-A). Hypervisor-B 114B may implement a second VTEP with (IP-B, VTEP-B), and hypervisor-C 114C a third VTEP with (IP-C, VTEP-C). Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual extensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks.

Network Services

EDGE 190 may be deployed to provide various centralized stateful network services to VMs 131-136. In practice, EDGE 190 may be an entity that is implemented using VM(s) and/or physical bare metal machine(s) to implement various functionalities of a switch, router, bridge, gateway, edge appliance, or any combination thereof. EDGE 190 is generally deployed at the edge of a geographical site at which hosts 110A-C are located. Example network services include dynamic host configuration protocol (DHCP), load balancing (LB), network address translation (NAT), domain name system (DNS), metadata proxy, intrusion detection system (IDS), deep packet inspection (DPI), IP address management (IPAM), DDI (i.e., an integration of DHCP, DNS and IPAM), etc.

In the following, DHCP will be described as an example network service using FIG. 2, which is a schematic diagram illustrating an example computer system for validation-based service request handling 200. In the example in FIG. 2, EDGE 190 may support various service nodes, including DHCP server 201 to provide host configuration service(s) to various VMs 131-136. DHCP may be implemented for IP address assignment and IP address lease renewal. DHCP may also be used to assign other configuration parameters, such as a subnet mask, a default gateway, etc. DHCP may be provided as part of a unified service (i.e., DDI) that integrates DHCP, DNS and IPAM, etc.

In practice, DHCP is a protocol that involves multiple transactions between DHCP server 201 and a DHCP client (e.g., VM1 131 on host-A 110A) using both broadcast and unicast packets. DHCP operations generally fall into four phases: (1) a DHCP client performing DHCP server discovery by broadcasting a DHCP discover message to reach multiple DHCP servers; (2) DHCP server 201 performing IP lease offer by sending a DHCP offer message; (3) the DHCP client accepting the offer by broadcasting a DHCP request message; and (4) DHCP server 201 returns a DHCP acknowledgement (ACK) or negative ACK (NACK) message to the DHCP client. During IP lease renewal, the DHCP client may broadcast another DHCP request message.

In SDN environment 100 with overlay networking, there is substantial cost to broadcast a packet within a logical network. In the example in FIG. 1, VM1 131 on host-A 110A, VM2 132 on host-B 110B and VM3 133 on host-C 110C may be connected to the same logical switch and therefore located on the same logical layer-2 segment. When VM1 131 sends a broadcast DHCP packet, it is necessary to send the DHCP packet to both VM2 132 on host-B 110B and VM3 133 on host-C 110C. To achieve this, the DHCP packet is encapsulated with an outer header (e.g., GENEVE header), and forwarded towards destination hosts 110B-C. The encapsulated packet is also forwarded towards DHCP server 201 connected to the same logical switch.

Destination host-B 110B may then perform decapsulation and forward the broadcast DHCP packet to all VNIC2 152 associated with VM2 132. Similarly, host-C 110C may then perform decapsulation and forward the broadcast DHCP packet to all VNIC3 153 associated with VM3 133. Since VM2 132 and VM3 133 are not DHCP servers, the DHCP packet will be dropped. Such broadcasting of service-related packets wastes networking bandwidth and processing resources. This is exacerbated when there is a large number of hosts and VMs deployed on a logical network.

Further, VMs 131-136 may be susceptible to security attacks during DHCP operations. For example, a malicious actor may gain access to the network and set up a "rogue" DHCP server to watch out for DHCP packets from a DHCP client, such as a DHCP discover message. In this case, the rogue DHCP server may attempt to respond to the DHCP discover message faster DHCP server 201. If successful, the rogue DHCP server may transmit manipulated or unusable parameters to the DHCP client. At the server side, DHCP server 201 may be susceptible to security attacks, such as a flooding or DOS attack where a large number of potentially malicious requests are sent towards DHCP server 201.

Validation-Based Service Request Handling

According to examples of the present disclosure, service request handling may be improved using a validation-based approach. In more detail, FIG. 2 is a schematic diagram illustrating example computer system 200 to perform validation-based service request handling. The example in FIG. 2 will be discussed using FIG. 3, which is a flowchart of example process 300 for a computer system to perform validation-based service request handling. Example process 300 may include one or more operations, functions, or actions illustrated by one or more blocks, such as 310 to 360. The various blocks may be combined into fewer blocks, divided into additional blocks, and/or eliminated depending on the desired implementation.

In the following, various examples will be discussed using host-A 110A as an example "computer system" and VM1 131 running on host-A 110A as an example "virtualized computing instance," DHCP as an example "network service," DHCP server 201 as an example "service node," etc. Besides DHCP, examples of the present disclosure may be implemented to provide other network service(s) such as IPAM, DNS, NAT, LB, DPI, IDS, DDI (i.e., integration of DHCP, DNS and IPAM), etc. To implement validation-based service request handling, host 110A/110B/110C may support any suitable software and/or hardware component(s), such as service relay agent 119A/119B/119C supported by hypervisor 114A/114B/114C. Service relay agent 119A/119B/119C should be contrasted against conventional relay nodes that are configured to forward DHCP packets from one network to another network in which a DHCP server is located. In practice, service relay agents 119A-C operate in a distributed manner to implement a distributed DHCP relay service in SDN environment 100 with overlay networking.

Figure 2:
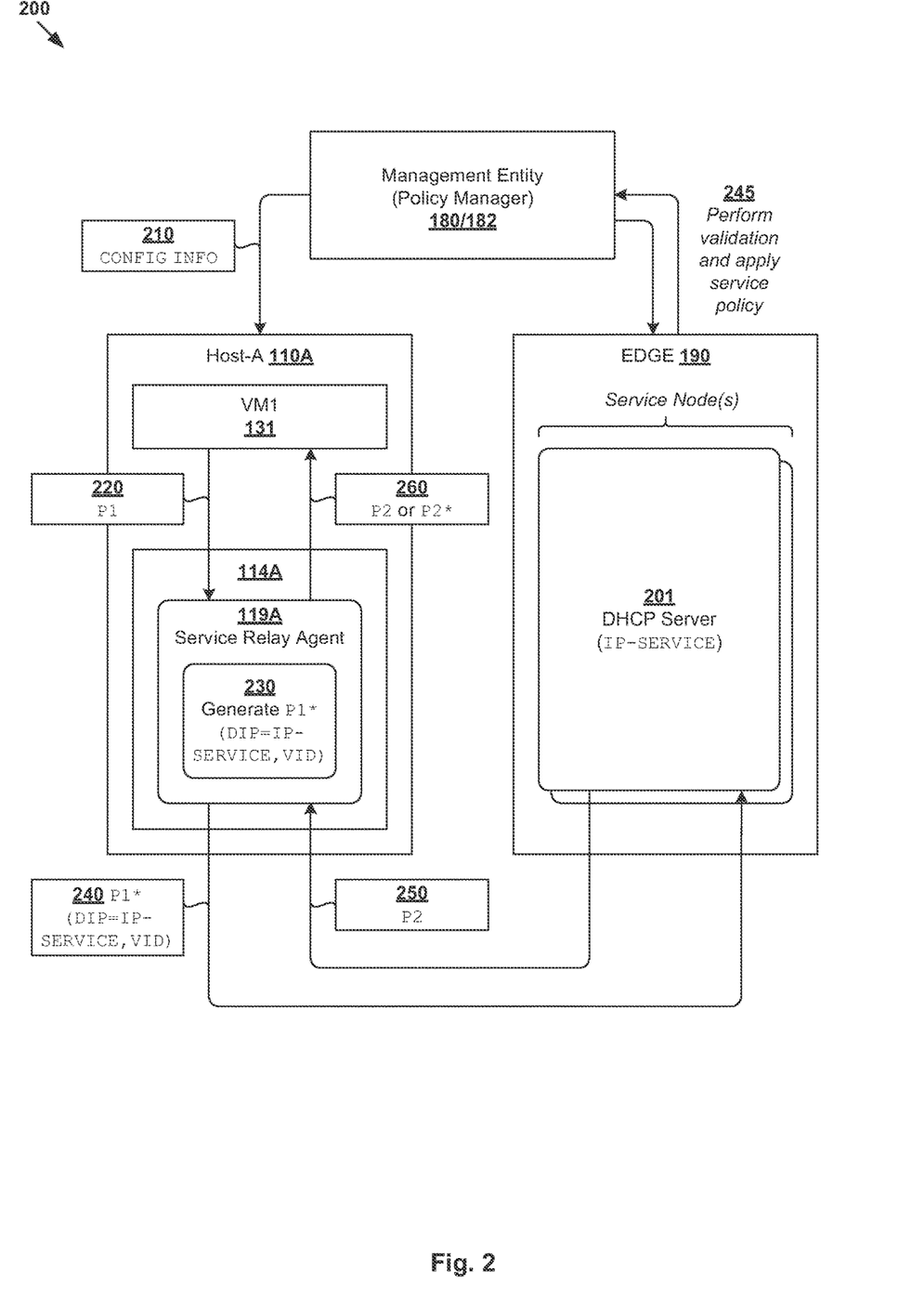
FIG. 2 is a schematic diagram illustrating an example computer system for validation-based service request handling.
Figure 3:
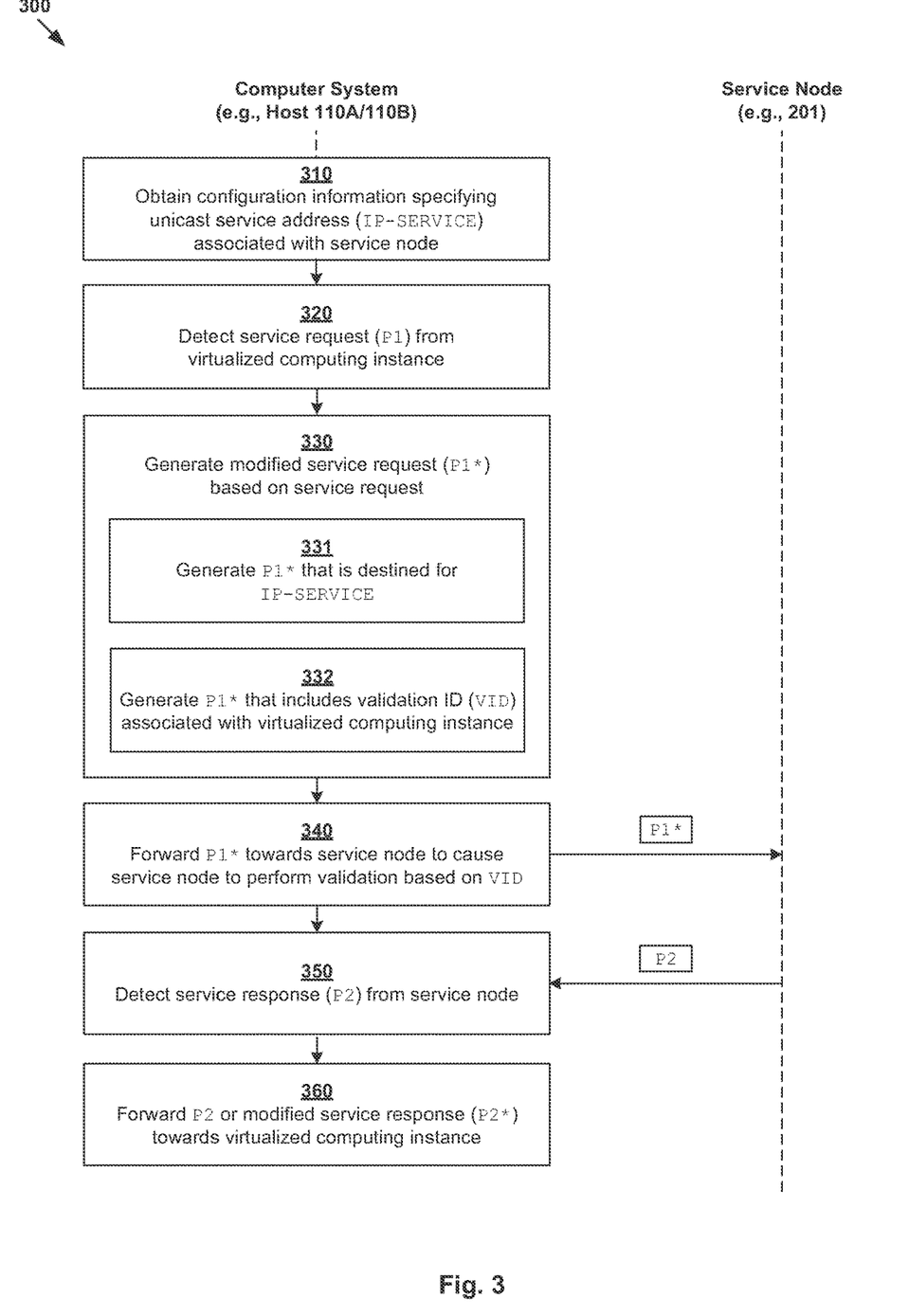
FIG. 3 is a flowchart of an example process for a computer system to perform validation-based service request handling.

At 210 in FIGS. 2 and 310 in FIG. 3, host-A 110A may obtain configuration information from management entity 180/182. The configuration information may specify unicast service address=IP-SERVICE associated with service node=DHCP server 201 capable of providing a DHCP service to VM1 131. Depending on the desired implementation, DHCP server 201 may be a server assigned VM1 131 as well as VM2 132 and VM3 133 that are connected to the same logical switch.

At 220 in FIGS. 2 and 320 in FIG. 3, host-A 110A (e.g., service relay agent 119A) may detect a service request (P1) for DHCP from VM1 131. Using DHCP as an example in FIG. 2, P1 220 may be a DHCP discover message that is destined for a broadcast address (e.g., DIP1=255.255.255.255) during a server discovery phase. Conventionally, DHCP requests such as the DHCP discover message are broadcasted within a logical network in which VM1 131 is deployed.

At 230-240 in FIGS. 2 and 330-340 in FIG. 3, host-A 110A (e.g., service relay agent 119A) may generate a modified service request (denoted as P1*) based on P1 220, and forward P1*240 towards DHCP server 201. In the example in FIG. 2, block 230 may involve configuring P1*240 to (a) be destined for unicast service address=IP-SERVICE and (b) include a validation identifier (ID) associated with VM1 131. See also 331-332 in FIG. 3. P1*240 may be forwarded towards DHCP server 201 to cause DHCP server 201 to perform validation based on the validation ID and to determine whether to provide the network service.

In practice, any suitable ID that is uniquely associated with VM1 131 may be used for validation by DHCP server 201 prior to providing the network service. For example, validation ID may include a VIF ID (e.g., VIF1 identifying LP1 161 connecting VM1 131 to a logical switch) and/or a logical segment ID (e.g., LS1 identifying a logical switch to which VM1 131 is connected). Alternatively or additionally, the validation ID may include a first universally unique identifier (UUID) associated with host-A 110A (i.e., host UUID) and/or a second UUID associated with VM1 131 (i.e., VM UUID). During validation, DHCP server 201 may interact with management entity 180/182, such as generating and sending a query to (and receiving a response from) a policy manager supported by management entity 180/182, etc. See also 245 in FIG. 2.

At 250 in FIGS. 2 and 350 in FIG. 3, host-A 110A (e.g., service relay agent 119A) may detect a service response (denoted as P2) from DHCP server 201. At 260 in FIGS. 2 and 360 in FIG. 3, host-A 110A (e.g., service relay agent 119A) may forward the service response, or a modified service response that is generated based on the service response, towards VM1 131.

Examples the present disclosure may be implemented to provide a two-way validation-based security feature between DHCP server 201 and a DHCP client supported by host 110A/110B/110C. For example, at the client side, host-A 110A may validate that DHCP server 201 is a trusted entity based on configuration information 210 specifying IP-SERVICE from management entity 180/182. At the server side, DHCP server 201 may validate P1*240 based on the validation ID to potentially identify and discard malicious requests.

In the case of DHCP, instead of broadcasting P1 220 (e.g., DHCP discover message), modified P1*240 may be forwarded towards DHCP server 201 in a unicast manner. This reduces the amount of service-related broadcast traffic in SDN environment 100 with overlay networking, thereby improving efficiency and reducing bandwidth wastage. Further, since P1 220 is not broadcasted, examples of the present disclosure may be implemented to reduce the likelihood of a DHCP client attracting service responses from rogue DHCP servers that are capable of monitoring and responding to broadcasted service requests. Various examples will be discussed below using FIGS. 4-7.

Network Service Configuration

Figure 4:
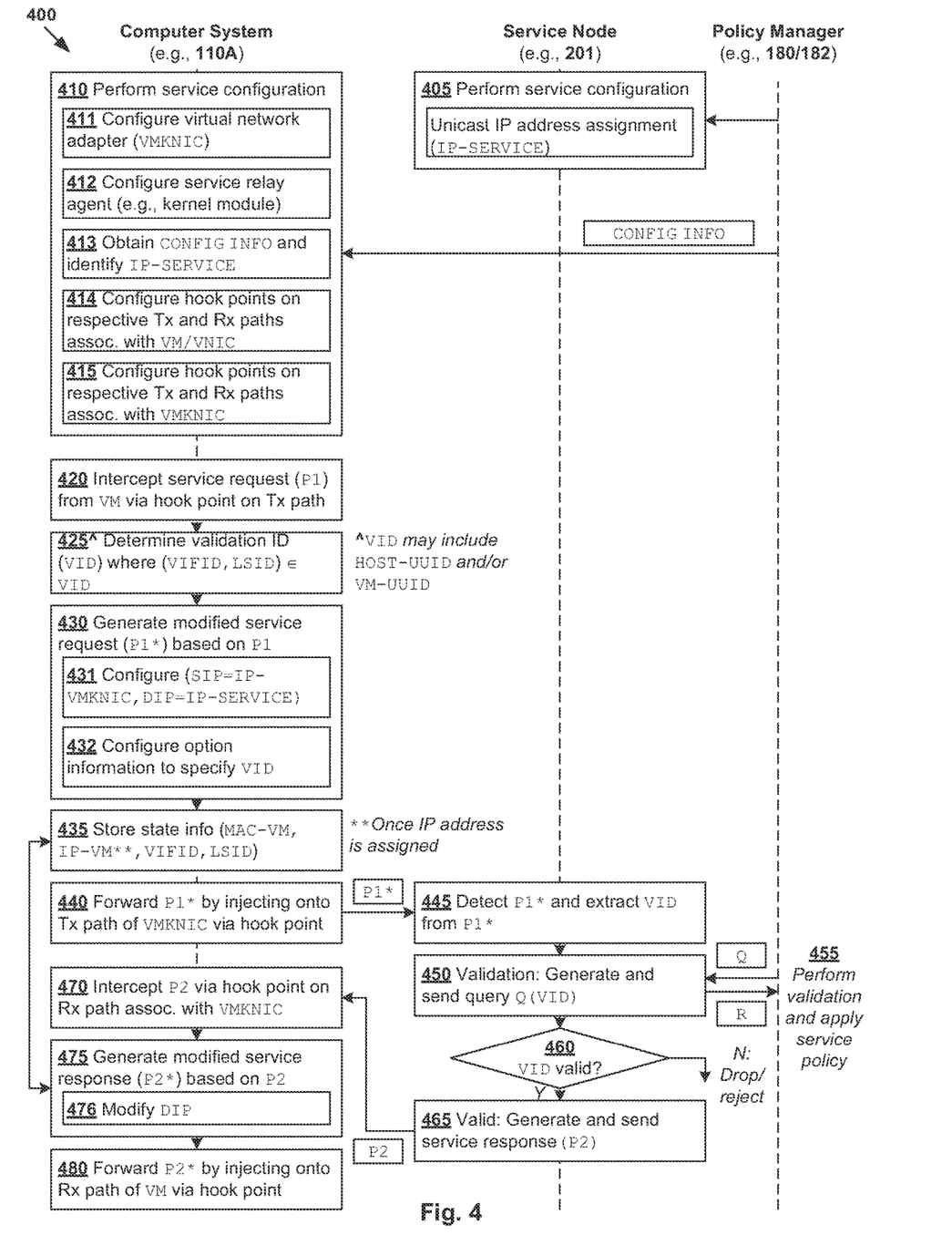
FIG. 4 is a flowchart of an example detailed process for validation-based service request handling.

FIG. 4 is a flowchart of example detailed process 400 for a computer system to perform validation-based service request handling. Example process 400 may include one or more operations, functions, or actions illustrated at 410 to 480. The various operations, functions or actions may be combined into fewer blocks, divided into additional blocks, and/or eliminated depending on the desired implementation. The example in FIG. 4 will be discussed using FIG. 5, which is a schematic diagram illustrating first example 500 of validation-based service request handling during DHCP discovery and lease offer. Although explained using host-A 110A, examples of the present disclosure may be implemented using any other host 110B/110C, etc.

(a) Server Configuration

At 405 in FIG. 4, DHCP server 201 may be configured to perform server-side validation-based service request handling in response to receiving control or configuration information from management entity 180/182. For example, DHCP server 201 may be configured to handle service requests from VMs deployed on a particular logical network, such as VM1 131 on host-A 110A, VM2 132 on host-B 110B and VM3 133 on host-C 110C. DHCP server 201 may be assigned with a unicast IP address=IP-SERVICE for interacting with DHCP clients using unicast packets.

Examples of the present disclosure may be implemented along with any suitable network service model. For example, a cluster of multiple servers may be configured to handle service requests from one or more logical networks. In this case, in response to detecting a service request that is addressed to a unicast address associated with the cluster, a load balancing policy may be applied to select one server from the cluster to handle the service request. For a particular cluster, any suitable operating model may be implemented, such as active-standby (A/S), active-active (A/A), etc. Besides DHCP server 201, additional DHCP server(s) may be configured for handling service requests from a different logical network, such as DHCP requests from VM5 135 on host-A 110A, VM4 134 on host-B 110B and VM6 136 on host-C 110C.

(b) Host Configuration

At 410 in FIG. 4, host-A 110A may be configured to perform validation-based service request handling in response to receiving control or configuration information from management entity 180/182. As will be discussed in turn below, block 410 may involve virtual network adapter configuration (see 411), service relay agent configuration (see 412), unicast service address configuration (see 413) and hook point configuration (see 414-415).

In more detail, at 411 in FIG. 4, a dedicated virtual network adapter may be configured for DHCP traffic on host-A 110A, such as in the form of a virtual machine kernel NIC (VMKNIC). For example in FIG. 5, a dedicated DHCP TCPIP stack (not shown) and associated VMKNIC 505 may be configured on hypervisor-A 114A in order to leverage service relay agent 119A to handle unicast DHCP packets for VNIC1 151. In this case, block 411 may involve assigning VMKNIC 505 may with an IP address (e.g., IP-VMKNIC) to receive and send unicast DHCP packets (to be explained below).

Figure 5:
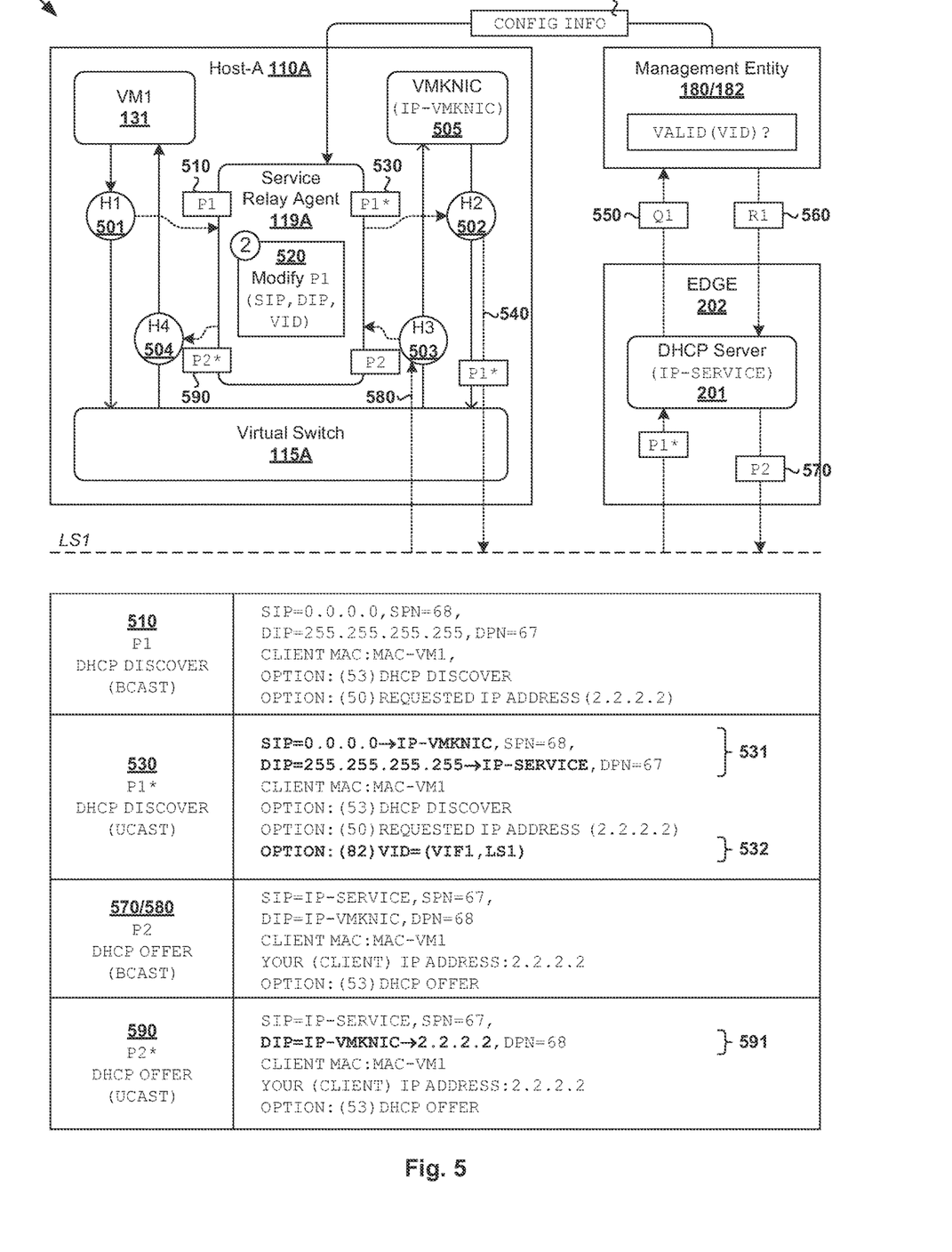
FIG. 5 is a schematic diagram illustrating a first example of validation-based service request handling during dynamic host configuration protocol (DHCP) discovery and lease offer.

In practice, host 110A/110B/110C may implement a networking layer (e.g., VMkernel networking layer) to provide connectivity among hosts 110A-C and handle various types of system traffic, including DHCP traffic, etc. Depending on the desired implementation, a separate VMKNIC may be configured for each type of system traffic. Besides VMKNIC 505, additional VMKNICs may be configured to handle one or more of the following system traffic types: VM migration traffic from one host to another, provisioning traffic, IP storage and discovery traffic, fault tolerance traffic, data replication traffic, virtual storage area network (VSAN) traffic, network file copy (NFC) traffic, memory access traffic, management traffic, etc.

At 412 in FIG. 4, service relay agent 119A may be configured on host-A 110A. In practice, service relay agent 119A may be implemented using any suitable approach, such as a kernel module (known as a DHCP relay kernel module) running on hypervisor-A 114A, etc. Alternatively, service relay agent 119A may be implemented at a VNIC layer supported by host-A 110A, a sidecar container within a container-based (e.g., Kubernetes) environment, etc.

As will be described further below, service relay agent 119A may be configured to (i) monitor the lifecycle of VNIC port(s) to insert/remove hook points (see 415 below), (ii) manage hook points associated with VMKNIC 505 (see 414 below), (iii) receive and store configuration information associated with DHCP servers from management entity 180/182, (iv) manage mapping information associating (MAC address, IP address, virtual interface ID, segment ID) for service request handling and (v) query and manage IP address information associated with VMKNIC 505.

At 413 in FIG. 4, based on configuration information obtained from management entity 180/182, service relay agent 119A may learn that DHCP server 201 is assigned to handle DHCP packets from VM1 131 via VNIC1 151. The configuration information (see also 506 in FIG. 5) may specify unicast service address=IP-SERVICE associated with DHCP server 201. Since IP-SERVICE is provided by management entity 180/182, service relay agent 119A may learn that DHCP server 201 is a trusted entity to interact with. Any other DHCP servers that are not configured or assigned by management entity 180/182 may be ignored. Compared to conventional approaches that rely on broadcast traffic, examples of the present disclosure may reduce the likelihood of, if not prevent, interaction with rogue DHCP servers that monitor those broadcast traffic.

(d) Hook Point Configuration

At 414 in FIG. 4, in response to detecting the configuration or creation of VMKNIC 505 associated with a dedicated TCP/IP instance (e.g., netstack) for DHCP service request handling, service relay agent 119A may insert a first pair of hook points (denoted as H2 502 and H3 503) on respective transmit (Tx) path and receive (Rx) path associated with VMKNIC 505. One hook point (H2) 502 may be configured on the Tx path for service relay agent 119A to inject modified DHCP packets for forwarding towards DHCP server 201. Another hook point (H3) 503 on the Rx path may be configured to filter or intercept ingress DHCP packets (e.g., from DHCP server 201) and steer them towards service relay agent 119A for processing.

At 415 in FIG. 4, in response to detecting an enablement of a port associated with VNIC1 151 to which VM1 131 is connected, service relay agent 119A may insert a second pair of hook points (denoted as H1 501 and H4 504) on respective Tx path and Rx path associated with VM1 131 and VNIC1 151. One hook point (H1) 501 may be configured to on the Tx path filter or intercept egress DHCP packets from VNIC1 151 and steer them towards service relay agent 119A for processing. Another hook point (H4) 504 may be configured on the Rx path for service relay agent 119A to inject DHCP packets for forwarding towards VM1 131 via VNIC1 151. Hook point (H4) 504 may also be configured for filtering or intercepting (potentially malicious) DHCP packets that are not forwarded by service relay agent 119A. Note that block 415 may be repeated for other VNIC ports, such as a port associated with VNIC5 155 of VM1 135 supported by host-A 110A.

First Example: DHCP Server Discovery and Lease Offer (a) First Service Request (DHCP Discover Message)

At 510 in FIG. 5, service relay agent 119A may intercept or detect a first service request (denoted as "P1") in the form of a DHCP discover message broadcasted by VM1 131. P1 510 may specify SIP=0.0.0.0, DIP=255.255.255.255 (i.e., broadcast destination address), DPN=67 and client MAC address=MAC-VM1 associated with VM1 131. In this case, P1 510 may specify a requested IP address (IP-VM1) =2.2.2.2, which is usually assigned if available. Otherwise, if the requested IP address is not available, an alternative may be assigned. P1 510 may be intercepted using first hook point=H1 501 inserted by service relay agent 119A onto the Tx path associated with VM1 131 and VNIC1 151. See also 420 in FIG. 4.

At 520 in FIG. 5, service relay agent 119A may determine a validation ID associated with VM1 131, and store mapping information associating MAC address=MAC-VM1 with the validation ID. For example, the validation ID may include (VIF1, LS1), where VIF1 is a virtual interface (VIF) ID and LS1=logical segment ID or logical switch ID associated with VM1 131. Depending on the desired implementation, VIF1 may uniquely identify logical switch port=LP1 161 or VNIC1 151 associated with VM1 131. VMs that are attached the same logical switch may share the same logical segment ID, but different VIF IDs. As will be explained further below, the validation ID may be used by DHCP server 201 to validate and manage DHCP requests on the server side. See also 425 in FIG. 4.

Further, at 520-530 in FIG. 5, service relay agent 119A may generate a modified service request (denoted as P1*530) in the form of a modified DHCP discover message based on P1 510. In this example, P1*530 may be generated by replacing (SIP=0.0.0.0, DIP=255.255.255.255) with (SIP=IP-VMKNIC, DIP=IP-SERVICE), where IP-VMKNIC is a unicast service address assigned to VMKNIC 505 and IP-SERVICE is a unicast service address assigned to DHCP server 201. In other words, P1 510 is converted from a broadcast packet to a unicast packet. P1*530 may be generated to include validation ID=(VIF1, LS1) for validation by DHCP server 201. See also 430-432 in FIGS. 4 and 530-531 in FIG. 5.

In practice, P1*530 may be generated to include an option field (e.g., DHCP relay agent information option) specifying or carrying validation ID=(VIF1, LS1). Implementation details relating to DHCP relay agent information option may be found in Request For Comment (RFC) 3046 that is entitled "DHCP Relay Agent Information Option" and maintained by the Internet Engineering Task Force (IETF). The content of RFC 3046 is incorporated herein by reference. The DHCP relay agent information option may be organized as a single option that includes one or more sub-options. A first sub-option field (e.g., agent circuit ID field) may be set to specify a logical segment ID (e.g., LS1). A second sub-option field (e.g., agent remote ID field) may be set to specify a virtual interface (VIF) ID (e.g., VIF1).

At 540 in FIG. 5, service relay agent 119A may forward P1*530 towards DHCP server 201 via virtual switch 115A, such as by injecting it into a Tx path of dedicated VMKNIC 505 via second hook point=H2 502. P1*530 may be encapsulated with an outer header (e.g., GENEVE header) before being sent towards EDGE 202 via physical network 105. EDGE node 202 (e.g., logical router) may perform decapsulation and forward modified P1*530 towards DHCP server 201. Packet encapsulation and decapsulation are not shown in FIGS. 5-6 for simplicity. See also 440 in FIG. 4.

To keep track of various service packets from different VMs, service relay agent 119A may maintain or store state information associated with each VM. For example, the state information may include MAC address=MAC-VM1 and validation ID=(VIF1, LS1) associated with VM1 131. The state information may be updated to include IP address=IP-VM1 (e.g., 2.2.2.2) once assigned. See 435 in FIG. 4.

(b) First Service Response (DHCP Offer Message)

At 550-560 in FIG. 5, in response to receiving P1*530, DHCP server 201 may perform validation by generating and sending a query (Q1) specifying validation ID=(VIF1, LS1) to management entity 180/182. The validation process may protect DHCP server 201 from having to respond to unwanted DHCP packets from malicious attackers. Any suitable approach may be implemented to support the querying process, such as using Representational State Transfer (REST) application programming interface (API) call(s), Google remote procedure call (gRPC) channel, etc. See also 445-460 in FIG. 4.

Depending on the desired implementation, the validation process may involve determining whether validation ID= (VIF1, LS1) associated with VM1 131 is valid, particularly whether P1*530 came from a valid (VIF ID, logical segment ID) combination. If yes, the validation process may further involve applying one or more policies to determine whether to respond to the service request. One example policy may specify a maximum number of DHCP requests associated with a particular validation ID within a predetermined period of time to reduce the likelihood of DHCP flooding or denial of service (DOS) attack. This policy helps reduce the number of IP addresses used or assigned. Another example policy may involve determining that the validation ID is invalid if the validation ID is on a blacklist. If DHCP server 201 is currently operating as a standby server, the request may be blocked. In practice, any suitable policies may be configured for other network services. Using LB service as an example, an example policy is to validate the validation ID to determine whether to provide the LB service. This is also applicable to NAT, DNS, DPI, DDI, etc.

At 570 in FIG. 5, DHCP server 201 may determine whether the validation ID in P1*530 is valid based on a response (R1) from management entity 180/182. If valid, DHCP server 201 may generate and send a service response in the form of a DHCP offer message (denoted as P2 570) towards host-A 110A via physical network 105. P2 570 may specify (SIP=IP-SERVICE, DIP=IP-VMKNIC), client MAC address=MAC-VM1 and client IP address=2.2.2.2 to be assigned to VM1 131. P2 570 may be encapsulated with an outer header before being forwarded from EDGE 190 towards host-A 110A via physical network 105. See also 465 in FIG. 4.

At 580 in FIG. 5, host-A 110A (e.g., VTEP) may perform decapsulation to remove the outer header and forward P2 570 towards an Rx path of dedicated VMKNIC 505. At 590, in response to intercepting P2 570 via third hook point=H3 503 configured on the Rx path, service relay agent 119A may generate a modified DHCP offer message (denoted as P2*590), such as by replacing DIP=IP-VMKNIC with a requested IP address=2.2.2.2 offered to VM1 131. The state information maintained by service relay agent 119A may be updated to specify (MAC-VM1, IP-VM2=2.2.2.2, VIF ID=VIF1, segment ID=LS1). See also 470 and 475-476 in FIG. 4.

At 590 in FIG. 5, service relay agent 119A may forward P2*590 towards VM1 131 via virtual switch 115A. This may involve injecting P2*590 onto the Rx path of VNIC1 151 via fourth hook point=H4 504. See also 480 in FIG. 4.

Second Example: Lease Request and Acknowledgement

Blocks 420-480 may be performed during other phases of DHCP. Another example will be explained using FIG. 6, which is a schematic diagram illustrating second example 600 of validation-based service request handling during DHCP lease request and acknowledgement. Note that various implementation details discussed using FIG. 5 are also applicable here and will not be repeated for brevity.

Figure 6:
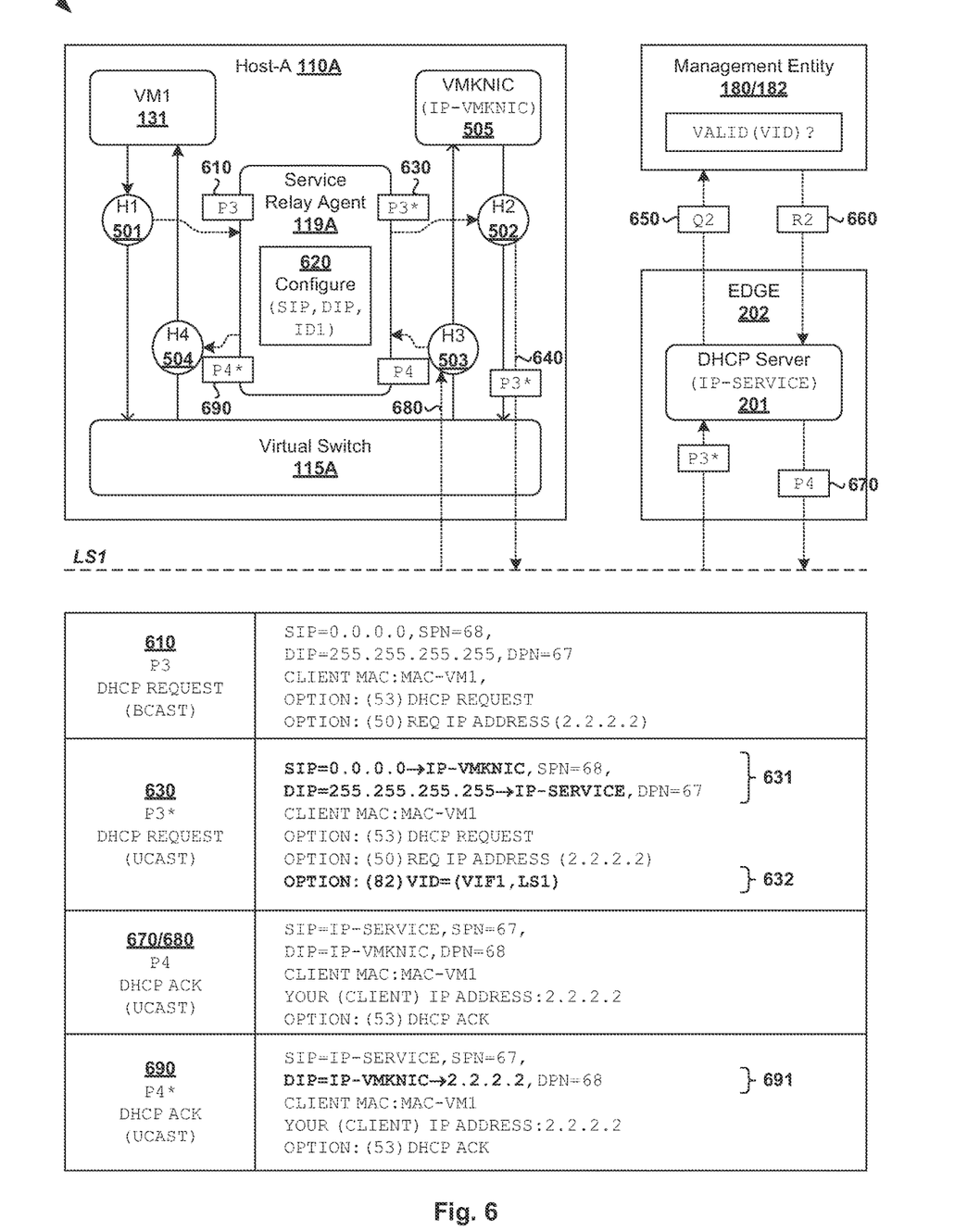
FIG. 6 is a schematic diagram illustrating a second example of validation-based service request handling during DHCP lease request and acknowledgement.

At 610-640 in FIG. 6, in response to intercepting or hijacking a DHCP lease request message (P3) via first hook point=H1 501 on a Tx path associated with VM1 131, service relay agent 119A may generate and forward a modified DHCP lease request message (P3*) towards DHCP server 201. Here, P3*630 may be configured to specify (SIP=IP-VMKNIC, DIP=IP-SERVICE) instead of (SIP=0.0.0.0, DIP=255.255.255.255) in P3 610. P3*630 may include validation ID=(VIF1, LS1) to cause DHCP server 201 to perform validation and determine whether to provide the DHCP service. To reach DHCP server 201, P3*630 may be injected onto a Tx path associated with VMKNIC 505 via second hook point=H2 502. See 631-632 in FIG. 6.

At 650-660 in FIG. 6, in response to receiving P3*630, DHCP server 201 may perform validation to determine whether validation ID=(VIF1, LS1) is valid. Similar to FIG. 5, the validation process may once again involve interacting with management entity 180/182 (see query Q2 and response R2). Alternatively, DHCP server 201 may maintain state information that includes an entry specifying whether validation ID=(VIF1, LS1) is valid following the querying process at 550-560 in FIG. 5. This approach reduces the amount of control plane traffic with management entity 180/182. The entry may be aged once a certain amount of time has elapsed. At 670, in response to determination that validation ID in P3*630 is valid, DHCP server 201 may generate and send a DHCP ACK message (P4) towards host-A 110A.

At 680 in FIG. 6, service relay agent 119A may intercept or hijack service response=P4 670 via third hook point=H3 503 configured on an Rx path associated with VMKNIC 505. At 690, service relay agent 119A may forward a modified DHCP ACK message (P4*) towards VM1 131 by injecting it onto an Rx path associated with VM1 131 via fourth hook point=H4 504. P4*690 may specify DIP=IP-VM1 instead of DIP=IP-VMKNIC in P4 670. See also 691 in FIG. 6.

Third Example: DHCP Lease Renewal and Release

Figure 7:
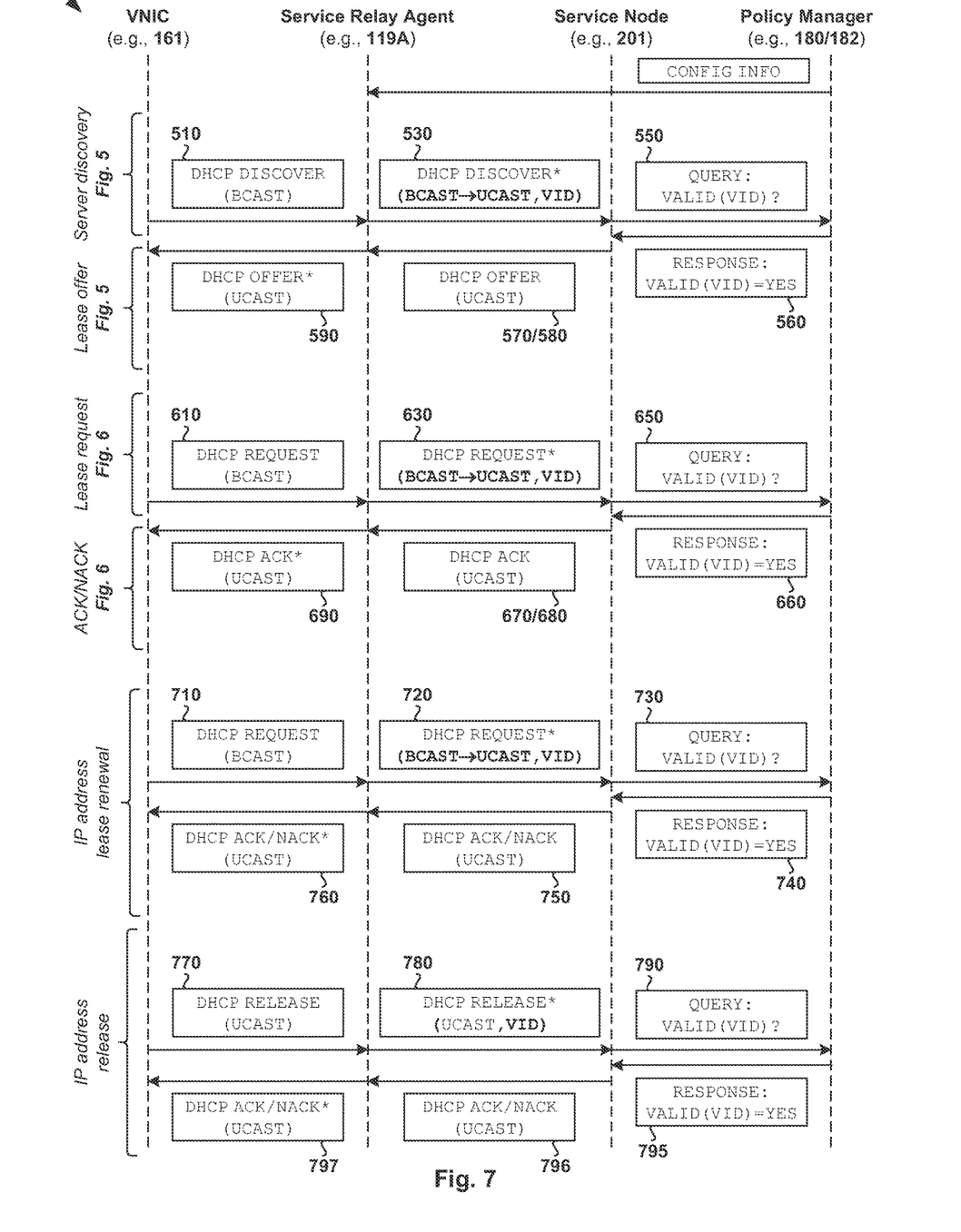
FIG. 7 is a schematic diagram illustrating a third example of validation-based service request handling during DHCP lease renewal and release.

FIG. 7 is a schematic diagram illustrating third example 700 of validation-based service request handling during DHCP lease renewal and release. FIG. 7 provides a summary of various phases of DHCP according to examples of the present disclosure. The phases include DHCP server discovery and IP address lease offer discussed using FIG. 5, IP address lease request and acknowledgement discussed using FIG. 6, as well as IP address lease renewal and release to be discussed below.

During lease renewal, service relay agent 119A may intercept a DHCP request for lease renewal (see 710) from VM1 131 and generate a modified request (see 720). Through broadcast-to-unicast conversion, modified request 720 may be destined for IP-SERVICE associated with DHCP server 201 instead of a broadcast address. Modified request 720 may also include a validation ID to cause DHCP server 201 to perform validation (see 730-740). If valid, DHCP server 201 may proceed with the lease renewal. In response to intercepting a response in the form of a DHCP ACK message (see 750), service relay agent 119A may generate a modified DHCP ACK (see 760) and forward it towards VM1 131.

During lease release, service relay agent 119A may intercept a DHCP request for lease release (see 770) from VM1 131 and generate a modified request (see 780) that includes a validation ID to cause DHCP server 201 to perform validation (see 790-795). If valid, DHCP server 201 may proceed with the lease release. In response to intercepting a response in the form of a DHCP ACK message (see 796) from DHCP server 201, service relay agent 119A may generate a modified DHCP ACK (see 767) and forward it towards VM1 131.

In practice, the validation process may be unsuccessful in a number of scenarios. In a first example, a validation ID might specify a combination of (VIF ID, logical segment ID) that does not exist. In a second example (discussed above), a validation ID may be determined to be valid but a DHCP request does not comply with a particular policy (e.g., exceeds the maximum number of requests within a predetermined period of time). In a third example, a DHCP request may be determined to be malicious because it does not include any validation ID at all. Further, DHCP server 201 may access a whitelist or a blacklist during the validation process. A request may be (a) rejected in response to determination that its validation ID is found in a blacklist, or (b) accepted in response to determination that its validation ID is found in a whitelist. Alternatively or additionally, the request may be rejected when DHCP server 201 is operating as a standby server.

To further improve security, service traffic between service relay agent 119A and DHCP server 201 may be encrypted, such as based on secure sockets layer (SSL), etc. In this case, service relay agent 119A may encrypt a modified request prior to injecting it onto a Tx path associated with VMKNIC 505 via first hook point=H1 501. At DHCP server 201, decryption may be performed to extract the validation ID for validation. The encryption and decryption process may also be performed on service response(s) from DHCP server 201 and service relay agent 119A.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-unit.

The invention claimed is:

1. A method, comprising:
    implementing, by a service relay agent supported by a hypervisor running on a physical host computer in a software-defined networking (SDN) environment comprising one or more logical overlay networks, a distributed dynamic host configuration protocol (DHCP) relay service;
    obtaining, by the service relay agent and from a SDN management entity, configuration information specifying a unicast service address associated with a DHCP server on a service node capable of providing a DHCP service to a virtualized computing instance supported by the hypervisor running on the physical host computer;

in response to detecting a DHCP request for the network service from the virtualized computing instance,
generating, by the service relay agent, a modified DHCP request based on the DHCP request, wherein the modified DHCP request (a) is destined for the unicast service address and (b) includes a validation identifier (ID) associated with the virtualized computing instance; and
forwarding the modified DHCP request towards the DHCP server; and in response to detecting a DHCP response from the DHCP server, forwarding the DHCP response, or a modified DHCP response that is generated based on the DHCP response, towards the virtualized computing instance.

2. The method of claim 1, wherein:
the DHCP request is addressed to a broadcast address and is associated with one of the following phases: DHCP server discovery, Internet Protocol (IP) address lease request and IP address lease renewal.

3. The method of claim 1, wherein generating the modified DHCP request comprises:
determining the validation ID associated with the virtualized computing instance, wherein the validation ID includes one or more of the following: (a) a virtual interface ID, (b) a logical segment ID, (c) a first universally unique identifier (UUID) associated with the physical host computer or the hypervisor and (d) a second universally unique identifier (UUID) associated with the virtualized computing instance.

4. The method of claim 1, wherein detecting the DHCP request comprises:
intercepting, by the service relay agent, the DHCP request onto a transmit (Tx) path associated with the virtualized computing instance via a first hook point configured on the Tx path.

5. The method of claim 1, wherein forwarding the modified DHCP request comprises:
injecting, by the service relay agent, the modified DHCP request onto a transmit (Tx) path associated with a virtual network adapter via a second hook point configured on the Tx path, wherein the modified DHCP request is addressed from the virtual network adapter to the unicast service address.

6. The method of claim 1, wherein detecting the DHCP response from the DHCP server comprises:
intercepting, by the service relay agent the DHCP response via a third hook point configured on a receive (Rx) path associated with a virtual network adapter via a third hook point configured on the Rx path.

7. The method of claim 1, wherein forwarding the DHCP response, or the modified DHCP response, towards the virtualized computing instance comprises:
injecting, by the service relay agent, the DHCP response or the modified DHCP response onto a receive (Rx) path associated with the virtualized computing instance via a fourth hook point configured on the Rx path.

8. A non-transitory computer-readable storage medium that includes a set of instructions executable by one or more processors to perform operations comprising:
implementing, by a service relay agent supported by a hypervisor running on a physical host computer in a software-defined networking (SDN) environment comprising one or more logical overlay networks, a distributed dynamic host configuration protocol (DHCP) relay service;
obtaining, by the service relay agent and from a SDN management entity, configuration information specifying a unicast service address associated with a DHCP server on a service node capable of providing a DHCP service to a virtualized computing instance supported by the hypervisor running on the physical host computer;

in response to detecting a DHCP request for the network service from the virtualized computing instance,
generating, by the service relay agent, a modified DHCP request based on the DHCP request, wherein the modified DHCP request (a) is destined for the unicast service address and (b) includes a validation identifier (ID) associated with the virtualized computing instance; and
forwarding the modified DHCP request towards the DHCP server; and in response to detecting a DHCP response from the DHCP server, forwarding the DHCP response, or a modified DHCP response that is generated based on the DHCP response, towards the virtualized computing instance.

9. The non-transitory computer-readable storage medium of claim 8, wherein:
the DHCP request is addressed to a broadcast address and associated with one of the following phases: DHCP server discovery, Internet Protocol (IP) address lease request and IP address lease renewal.

10. The non-transitory computer-readable storage medium of claim 8, wherein generating the modified DHCP request comprises:
determining the validation ID associated with the virtualized computing instance, wherein the validation ID includes one or more of the following: (a) a virtual interface ID, (b) a logical segment ID, (c) a first universally unique identifier (UUID) associated with the physical host computer or the hypervisor and (d) a second universally unique identifier (UUID) associated with the virtualized computing instance.

11. The non-transitory computer-readable storage medium of claim 8, wherein intercepting the DHCP request comprises:
intercepting, by the service relay agent, the DHCP request onto a transmit (Tx) path associated with the virtualized computing instance via a first hook point configured on the Tx path.

12. The non-transitory computer-readable storage medium of claim 8,
wherein forwarding the modified DHCP request comprises:
injecting, by service relay agent, the modified DHCP request onto a transmit (Tx) path associated with a virtual network adapter via a second hook point configured on the Tx path, wherein the modified DHCP request is addressed from the virtual network adapter to the unicast service address.

13. The non-transitory computer-readable storage medium of claim 8, wherein detecting the DHCP response from the DHCP server comprises:
intercepting, by the service relay agent, the DHCP response via a third hook point configured on a receive (Rx) path associated with a virtual network adapter via a third hook point configured on the Rx path.

14. The non-transitory computer-readable storage medium of claim 8, wherein forwarding the DHCP response, or the modified DHCP response, towards the virtualized computing instance comprises:

injecting, by service relay agent, the DHCP response or the modified DHCP response onto a receive (Rx) path associated with the virtualized computing instance via a fourth hook point configured on the Rx path.

15. A computer system, comprising:

a processor; and a non-transitory computer-readable storage medium that includes a set of instructions executable by one or more processors to perform operations comprising:

implementing, by a service relay agent supported by a hypervisor running on a physical host computer in a software-defined networking (SDN) environment comprising one or more logical overlay networks, a distributed dynamic host configuration protocol (DHCP) relay service;

obtaining, by the service relay agent and from a SDN management entity, configuration information specifying a unicast service address associated with a DHCP server on a service node capable of providing a DHCP service to a virtualized computing instance supported by the hypervisor running on the physical host computer;

in response to detecting a DHCP request for the network service from the virtualized computing instance,         generating, by the service relay agent, a modified DHCP request based on the DHCP request, wherein the modified DHCP request (a) is destined for the unicast service address and (b) includes a validation identifier (ID) associated with the virtualized computing instance; and         forwarding the modified DHCP request towards the DHCP server; and     in response to detecting a DHCP response from the DHCP server, forwarding the DHCP response, or a modified DHCP response that is generated based on the DHCP response, towards the virtualized computing instance.

16. The computer system of claim 15, wherein:

the DHCP request is addressed to a broadcast address and associated with one of the following: DHCP server discovery, Internet Protocol (IP) address lease request and IP address lease renewal.

17. The computer system of claim 15, wherein generating the modified DHCP request comprises:

determining the validation ID associated with the virtualized computing instance, wherein the validation ID includes one or more of the following: (a) a virtual interface ID, (b) a logical segment ID, (c) a first universally unique identifier (UUID) associated with the physical host computer or the hypervisor and (d) a second universally unique identifier (UUID) associated with the 8 virtualized computing instance.

18. The computer system of claim 15, wherein detecting the DHCP request comprises:

intercepting the DHCP request onto a transmit (Tx) path associated with the virtualized computing instance via a first hook point configured on the Tx path.

19. The computer system of claim 15, wherein forwarding the modified DHCP request comprises:

injecting the modified DHCP request onto a transmit (Tx) path associated with a virtual network adapter via a second hook point configured on the Tx path, wherein the modified DHCP request is addressed from the virtual network adapter to the unicast service address.

20. The computer system of claim 15, wherein detecting the DHCP response comprises:

intercepting the DHCP response via a third hook point configured on a receive (Rx) path associated with a virtual network adapter via a third hook point configured on the Rx path.

21. The computer system of claim 15, wherein forwarding the DHCP response, or the modified DHCP response, comprises:

injecting the DHCP response or the modified DHCP response onto a receive (Rx) path associated with the virtualized computing instance via a fourth hook point configured on the Rx path.

\* \* \* \* \*